May 8, 1956    H. P. TROENDLY    2,744,598
ONE-WAY ENGAGING MECHANISM
Filed Feb. 7, 1952
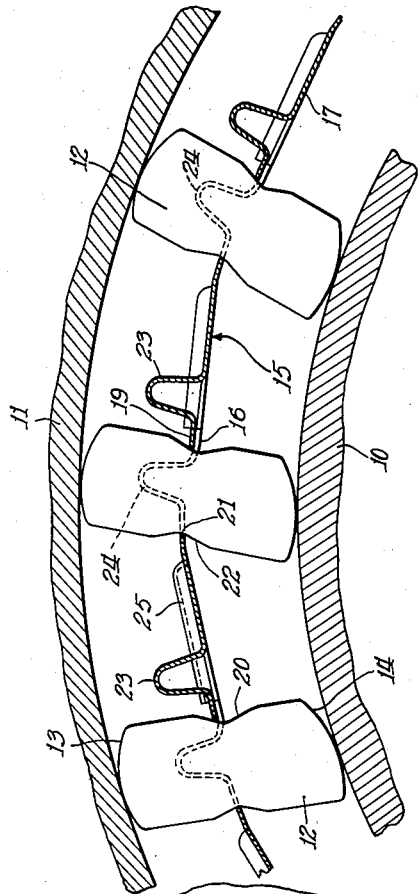
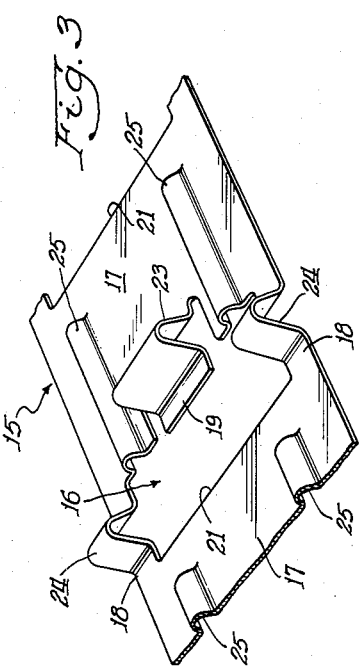
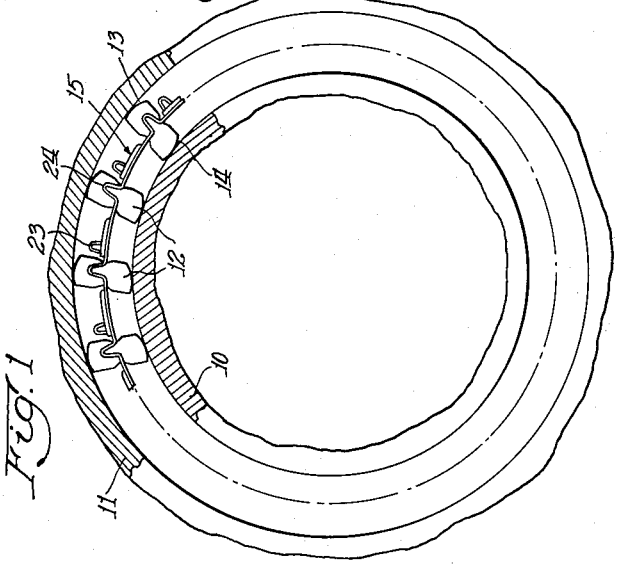
Inventor:
Harry P. Troendly
By: Frank C. Parker
Atty.

United States Patent Office 2,744,598
Patented May 8, 1956

2,744,598

ONE-WAY ENGAGING MECHANISM

Harry P. Troendly, La Grange Park, Ill., assignor to Borg-Warner Corporation, Chicago, Ill., a corporation of Illinois Application February 7, 1952, Serial No. 270,395

8 Claims. (Cl. 192—45.1)

The present invention relates generally to one-way engaging devices and more particularly to one-way engaging devices of the type employing tiltable sprags or grippers disposed between a pair of substantially concentric races and having a resilient sprag retainer for spacing the sprags between the races and tilting them into wedging engagement with the races.

The present invention comprises an improvement in one-way engaging devices of the general type disclosed in the copending applications of E. A. Ferris, Ser. No. 202,385, filed December 22, 1950, and H. P. Troendly and E. A. Ferris, Ser. No. 263,064, filed December 24, 1951.

The primary object of the present invention is to provide, in a one-way engaging device of the aforementioned general type, an improved resilient or flexible sprag or gripper retainer having a plurality of openings for peripherally spacing the sprags between the concentric races of the device and having deformations in the portions of the flexible retainer between the adjacent sprag receiving openings so as to peripherally strengthen or rigidify the retainer to prevent buckling thereof between the adjacent sprags when one of the sprags pops out of engagement with the races and thereby gets out of phase with the remainder of the sprags.

A more specific object of the present invention is to provide a sprag retainer for one-way engaging devices, wherein the retainer is made of a strip of flexible sheet metal and the portions thereof between the sprag receiving openings are deformed so as to provide a pair of peripherally extending ribs to thereby rigidify these portions of the retainer so as to prevent buckling of the retainer between adjacent sprags when one or more of the sprags gets out of phase with the remainder of the sprags.

The sprag retainer utilized in the present invention is particularly suitable for applications where the one-way engaging device is not required to transmit excessive torque loads and, in such a case, the added rigidity provided in the retainer, due to the peripherally extending ribs between the adjacent sprag receiving openings, gives the retainer sufficient strength to absorb the shock from any sprags which may get out of phase and strike the portions of the retainer between the adjacent sprags. By utilizing the teachings disclosed in the present invention a single annular ring of flexible sheet metal is all that is needed for spacing the sprags and energizing them so as to continuously tilt them into wedging engagement with the races. Since but a single annular ring of sheet metal is required, it is obvious that the present construction is cheaper to manufacture than conventional sprag retainers of the present general type.

The foregoing objects and advantages of the present invention will become apparent from the following detailed description when read in conjunction with the accompanying drawings wherein:

Fig. 1 is a side elevational view of a one-way engaging device comprising the subject matter of the present invention;

Fig. 2 is a detailed elevational view of the device shown in Fig. 1; and

Fig. 3 is a fragmentary perspective view of the sprag retainer for spacing and energizing the sprags.

With reference to the drawings, wherein like reference numerals in the different views identify identical parts, the one-way engaging device comprising the subject matter of the present invention comprises a pair of inner and outer substantially concentric races 10 and 11 and a plurality of sprags or grippers 12 disposed between the races 10 and 11. Each of the sprags 12 has a pair of eccentric wedging surfaces 13 and 14 for respectively engaging the outer race 11 and inner race 10 upon tilting of the sprags 12 in a counterclockwise direction, as viewed in Fig. 2. When the outer race 11 tends to rotate counterclockwise, relative to the inner race 10, the eccentric surfaces, 13 and 14, become wedgingly engaged with the respective races to connect them together for rotation in unison. When the outer race 11 tends to rotate in a clockwise direction, relative to the inner race 10, this effects a clockwise tilting of the sprags 12 so that the outer race 11 may overrun the inner race 10.

The sprags 12 are uniformly spaced peripherally between the concentric races 10 and 11, and this peripheral spacing is maintained by an annular flexible sheet metal cage or retainer 15. The sheet metal retainer 15 consists of a strip of sheet metal having its ends joined together to form an annular ring. The cage 15 is provided with a plurality of peripherally spaced openings 16 for receiving the sprags, and the openings 16 are defined by transversely extending cross pieces 17 and peripherally extending side portions 18. An energizing tab 19, which is integrally formed with each of the cross pieces 17, extends into each of the openings 16, the tabs 19 being respectively seated within a transverse slot 20 in one side of each sprag for continuously energizing or tilting the sprags 12 in a counterclockwise direction about the opposite edge 21 of the openings 16, respectively seated within slots 22 of the sprags 12. This energization of the sprags 12 by the tabs 19 is continuously effective to tilt them into wedging engagment with the races 10 and 11. The tabs 19 are each formed with a transverse corrugation or wrinkle 23 for providing a peripheral yield between each of the sprags 12. Transverse corrugations or wrinkles 24, intersecting each of the openings 16, are also provided for peripherally stressing the cage 15 either in compression or tension so that the sprags 12 and retainer 15 will rotate with either the inner race or the outer race during overrunning, as desired.

In order to provide rigidity of the cage 15 between the sprags 12, each of the cross pieces 17 is deformed to provide a pair of peripherally extending ribs 25. These ribs 25 function to minimize buckling of the retainer 15 between the sprags 12.

In the operation of the present one-way engaging device, the tabs 19 continuously exert a biasing or energizing force on the sprags 12, tending to constantly tilt the sprags in a counterclockwise direction to bring their eccentric surfaces 13 and 14 into wedging engagement with the outer race 11 and inner race 10 respectively. When the outer race tends to rotate in a counterclockwise direction relative to the inner race, the biasing force exerted by the tabs 12 is immediately effective to cause the sprags to wedgingly engage the races. During the initial engagement of the sprags 12 with the races, torsional vibration of the shafts to which the races are secured, as well as vibration of the engaging devices as a whole, sometimes causes one or more of the sprags to pop out of engagement with the races and exert a violent compressive force on its associated tab 19. The transverse wrinkles 23, in the tabs 19, permit the tabs to yield under these conditions and the sprags then strike the cross pieces 17. The peripherally extending ribs 25 in each of the cross pieces afford sufficient rigidity for the retainer 15 to stop the movement of any of the out-of-phase sprags. Immediately after the out-of-phase sprags strike the cross pieces 17 the compressed tabs 19 expand and again exert biasing or energizing forces on the out-of-phase sprags to cause them to reengage both of the races 10 and 11.

The transverse wrinkles 24, in the side portions 18, may be initially stressed either in compression or tension and consequently the retainer and sprag assembly may be caused to rotate with either the outer race 11 or the inner race 10 during the overrunning condition of the engaging device.

As will be apparent to those skilled in the art, the present invention provides a flexible gripper or sprag retainer consisting of a strip of sheet metal so deformed as to provide means for positioning the sprags between the races, holding them in engagement with either of the races during the overrunning condition of the engaging device, continuously energizing the sprags to cause them to be immediately effective to engage the races and providing the necessary rigidity of the flexible retainer so that it is capable of absorbing the shock when one or more of the sprags gets out of phase with the remainder of the sprags. It is contemplated that numerous changes and modifications may be made in the present invention without departing from the spirit or scope thereof.

What is claimed is:

1. In a one-way engaging device, the combination of a pair of concentric races having a plurality of wedging devices disposed therebetween, and a flexible sheet material cage having peripherally spaced openings therein for receiving said wedging devices, said openings being defined by peripherally extending side portions and transversely extending cross pieces having energizing tabs integrally formed therewith and extending into each of said openings for respectively engaging the wedging devices and biasing them toward wedging engagement with said races, and deformations formed in each of said cross pieces for rigidifying the flexible cage against peripheral buckling between the wedging devices.

2. In a one-way engaging device, the combination of a pair of concentric races having a plurality of sprags disposed therebetween, and a flexible sheet metal cage having peripherally spaced openings therein for receiving said sprags, said openings being defined by peripherally extending side portions and transversely extending cross pieces having energizing tabs integrally formed therewith and extending into each of said openings for respectively engaging the sprags and biasing them toward wedging engagement with said races, and means defining peripherally extending grooves in each of said cross pieces for rigidifying the flexible cage against peripheral buckling between the wedging devices.

3. In a one-way engaging device, the combination of a pair of concentric races having a plurality of wedging devices disposed therebetween, and a flexible sheet metal cage having peripherally spaced openings therein for receiving said wedging devices, said openings being defined by peripherally extending side portions and transversely extending cross pieces having energizing tabs integrally formed therewith and extending into each of said openings for respectively engaging the wedging devices and biasing them toward wedging engagement with said races, and said cross pieces each being deformed to provide a pair of peripherally extending ribs therein for rigidifying the flexible cage against peripheral buckling between the wedging devices.

4. A cage structure for peripherally positioning a plurality of tiltable grippers between a pair of concentric races of a one-way engaging device and biasing the grippers toward wedging engagement with the races, comprising a substantially annular ring of resilient sheet metal having a plurality of gripper receiving openings spaced around its periphery defined by transversely extending cross pieces and a pair of peripherally extending side portions, integral energizing tabs on one side of said cross pieces and extending into each of said openings for engaging each of said grippers to bias them toward wedging engagement with the races, and said cross pieces each including means defining a plurality of peripherally extending channels for rigidifying the cross pieces against peripheral buckling.

5. A cage structure for peripherally positioning a plurality of tiltable grippers between a pair of concentric races of a one-way engaging device and biasing the grippers toward wedging engagement with the races comprising a substantially annular ring of resilient sheet metal having a plurality of gripper receiving openings spaced around its periphery defined by transversely extending cross pieces and a pair of peripherally extending side portions, integral energizing tabs on one side of said cross pieces and extending into each of said openings for engaging each of said grippers to bias them toward wedging engagement with the races, and means defining a pair of peripherally extending ribs in each of said cross pieces for rigidifying them against peripheral buckling.

6. A cage structure for peripherally positioning and energizing a plurality of tiltable wedging devices disposed between a pair of concentric races of a one-way engaging device comprising a strip of resilient sheet metal having its ends joined together to form an annular ring and having a series of longitudinally spaced openings for receiving said wedging devices, means defined by said sheet metal strip for respectively engaging each of said wedging devices to energize them toward wedging engagement with said races, and means in the portions of said sheet metal strip between each adjacent pair of openings therein defining longitudinally extending ribs for rigidifying the ring against longitudinal buckling.

7. A cage structure for positioning a plurality of tiltable grippers between a pair of races and biasing the grippers toward wedging engagement with the races, comprising a strip of resilient sheet metal having a plurality of spaced gripper receiving openings defined by transversely extending cross pieces and a pair of longitudinally extending side portions, integral energizing tabs on one side of said cross pieces and extending into each of said openings adapted to engage the respective grippers when they are disposed in the openings to bias them toward wedging engagement with the races, and deformations forming a plurality of longitudinal extending ribs in said cross pieces for rigidifying them against longitudinal buckling.

8. Cage structure adapted to peripherally position and energize a plurality of tiltable wedging devices disposed between a pair of concentric races of a one-way engaging device, comprising a strip of flexible sheet metal having a series of peripherally spaced openings adapted to receive the wedging devices, means defined by the strip and extending into each of the openings adapted to respectively engage each of said wedging devices to energize them toward wedging engagement with the races, and means in the portions of said sheet metal strip between each adjacent pair of openings therein defining peripherally extending ribs for rigidifying the strip against peripheral buckling.

References Cited in the file of this patent

UNITED STATES PATENTS

| | | |
|---|---|---|
| 2,342,227 | Swenson | Feb. 22, 1944 |
| 2,383,595 | Dodge | Aug. 28, 1945 |
| 2,389,961 | Dodge | Nov. 27, 1945 |
| 2,630,896 | Dodge | Mar. 10, 1953 |